United States Patent
Albrecht et al.

(10) Patent No.: US 8,219,725 B2
(45) Date of Patent: Jul. 10, 2012

(54) CACHE OPTIMIZED BALANCED HANDLING OF INITIATIVES IN A NON-UNIFORM MULTIPROCESSOR COMPUTING SYSTEM

(75) Inventors: Udo Albrecht, Schonaich (DE); Michael Jung, Frankfurt am Main (DE); Elke Nass, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/159,572

(22) Filed: Jun. 14, 2011

(65) Prior Publication Data

US 2011/0314187 A1  Dec. 22, 2011

(30) Foreign Application Priority Data

Jun. 16, 2010  (EP) .................................... 10166090

(51) Int. Cl.
*G06F 3/00* (2006.01)
*G06F 13/00* (2006.01)

(52) U.S. Cl. .......... 710/38; 710/267; 710/260; 710/264; 710/40; 710/48; 711/118; 711/133; 718/102; 718/105

(58) Field of Classification Search ........................ None
See application file for complete search history.

(56) References Cited

U.S. PATENT DOCUMENTS

| | | | |
|---|---|---|---|
| 5,265,215 A | 11/1993 | Fukuda et al. | |
| 5,307,495 A | 4/1994 | Seino et al. | |
| 6,189,065 B1* | 2/2001 | Arndt et al. | 710/260 |
| 6,601,153 B1* | 7/2003 | Engelbrecht et al. | 711/166 |
| 7,444,639 B2* | 10/2008 | Jahnke | 718/105 |
| 7,610,425 B2 | 10/2009 | Solomita et al. | |
| 7,953,915 B2* | 5/2011 | Ge et al. | 710/266 |
| 7,962,771 B2* | 6/2011 | Song et al. | 713/300 |

(Continued)

FOREIGN PATENT DOCUMENTS

CN  101126992 A  2/2008

(Continued)

OTHER PUBLICATIONS

Advanced Reversing, "Chapter 8: Advanced Programmable Interrupt Controller (APIC)", vol. 3, Chapter 8, 23 pages (Aug. 28, 2006).

*Primary Examiner* — Tammara Peyton
(74) *Attorney, Agent, or Firm* — John E. Campbell; Kevin P. Radigan, Esq.; Heslin Rothenberg Farley & Mesiti P.C.

(57) ABSTRACT

A balancing process between I/O processor groups of a non-uniform multiprocessor system enables spreading of I/O workload across multiple I/O processor groups on a group base as soon as the I/O processor group with maximum group utilization reaches a certain high limit together with other processor groups being utilized significantly lower. The additional balancing is decreased step by step again when a certain low utilization limit is reached or the workload becomes more evenly balanced between the I/O processor groups. Checking if increase or decrease of the balancing is required is done periodically, but with low frequency to not affect overall performance. The checking and balancing happens asynchronously in predefined intervals. This solves the problem that with an increasing number of I/O processors the handling of initiatives leads to increased cache traffic and contention due to shared data structures, which slows down the I/O workload handling significantly.

15 Claims, 7 Drawing Sheets

U.S. PATENT DOCUMENTS

| | | | |
|---|---|---|---|
| 8,001,308 B2 * | 8/2011 | Zimmer et al. | 710/260 |
| 2009/0172228 A1 | 7/2009 | Zimmer et al. | |
| 2009/0172423 A1 | 7/2009 | Song et al. | |
| 2009/0248934 A1 | 10/2009 | Ge et al. | |
| 2011/0145461 A1 * | 6/2011 | Zhao et al. | 710/267 |

FOREIGN PATENT DOCUMENTS

| | | |
|---|---|---|
| GB | 2 454 996 A | 5/2009 |
| WO | WO 2010020159 A1 | 2/2010 |

* cited by examiner

CACHE OPTIMIZED BALANCED HANDLING OF INITIATIVES IN A NON-UNIFORM MULTIPROCESSOR COMPUTING SYSTEM

PRIOR FOREIGN APPLICATION

This application claims priority from European Patent Application No. 10166090.0, filed Jun. 16, 2010, which is hereby incorporated herein by reference in its entirety.

BACKGROUND

The present invention relates to the field of high-performance, multiprocessor computer systems which are using an optimized Input/Output (I/O) subsystem that is based on dedicated System Assist Processors (SAPs) or I/O Processors (IOPs). These I/O processors perform communication between multiple Central Processing Units (CPUs) and many peripheral I/O devices attached via multiple I/O channel paths, e.g., for database business applications. More specifically, the present invention relates to processing I/O requests issued by the SAPs, and particularly, to how a request response issued by the I/O periphery is processed in the multiprocessor system.

An exemplary non-uniform multiprocessor computing system of the above mentioned shape is described in GB Application No. 2454996 A, which teaches a method for the balanced handling of inbound initiatives. In this context, an "initiative" is to be understood as a response to a former initiated I/O operation or as a request coming from an I/O device via an I/O path. Such a response is typically signalled via an I/O interrupt. In the prior art method these are the interrupts from the channels to the firmware running on the I/O processors.

A shortcoming of this prior art method is that with an increasing number of I/O processors the handling of initiatives leads to increased cache traffic and contention due to shared data structures, which slows down the initiative handling significantly. Further, it leads to increased firmware path length and control block contention due to an increasing number of processors detecting the same initiative at the same time, but only one processor is finally handling it.

Any potential solution to these n-way effect shortcomings would have to meet the following requirements: The initiatives need to be handled with as little cache and control block contention and overhead as possible, but peak or unbalanced workloads still need to be handled without any bottlenecks on one or some processors of the system.

BRIEF SUMMARY

According to one aspect of the present invention, a method for handling inbound initiatives in an input/output (I/O) subsystem of a multi-node computer system are proposed, wherein in each node, a plurality of I/O processors communicate with I/O devices, via a plurality of I/O paths corresponding to said plurality of nodes, and wherein said initiatives are generated by I/O hardware and/or firmware addressed by a precedent I/O request issued by a respective one of said I/O processors, and wherein said initiatives are to be processed by one or by a group of said multiple I/O processors. The method comprises using at least one pre-defined, first data element indicating incoming or existing initiatives from any I/O path of all of said nodes and to be served by one of said I/O processors; using a plurality of second data structures, one of said second structures per I/O processor group, wherein each of said second data structures defines which initiative is preferably handled by which I/O processor or group of processors, respectively; using a plurality of third data structures, one of said third structures per I/O processor group, wherein multiple bits can be set in order to indicate the occurrence of respective initiatives for respective multiple I/O processors; and repeatedly balancing the workload between the groups of I/O processors by distributing initiatives to other groups in addition to the preferred group.

Computer program products and systems relating to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
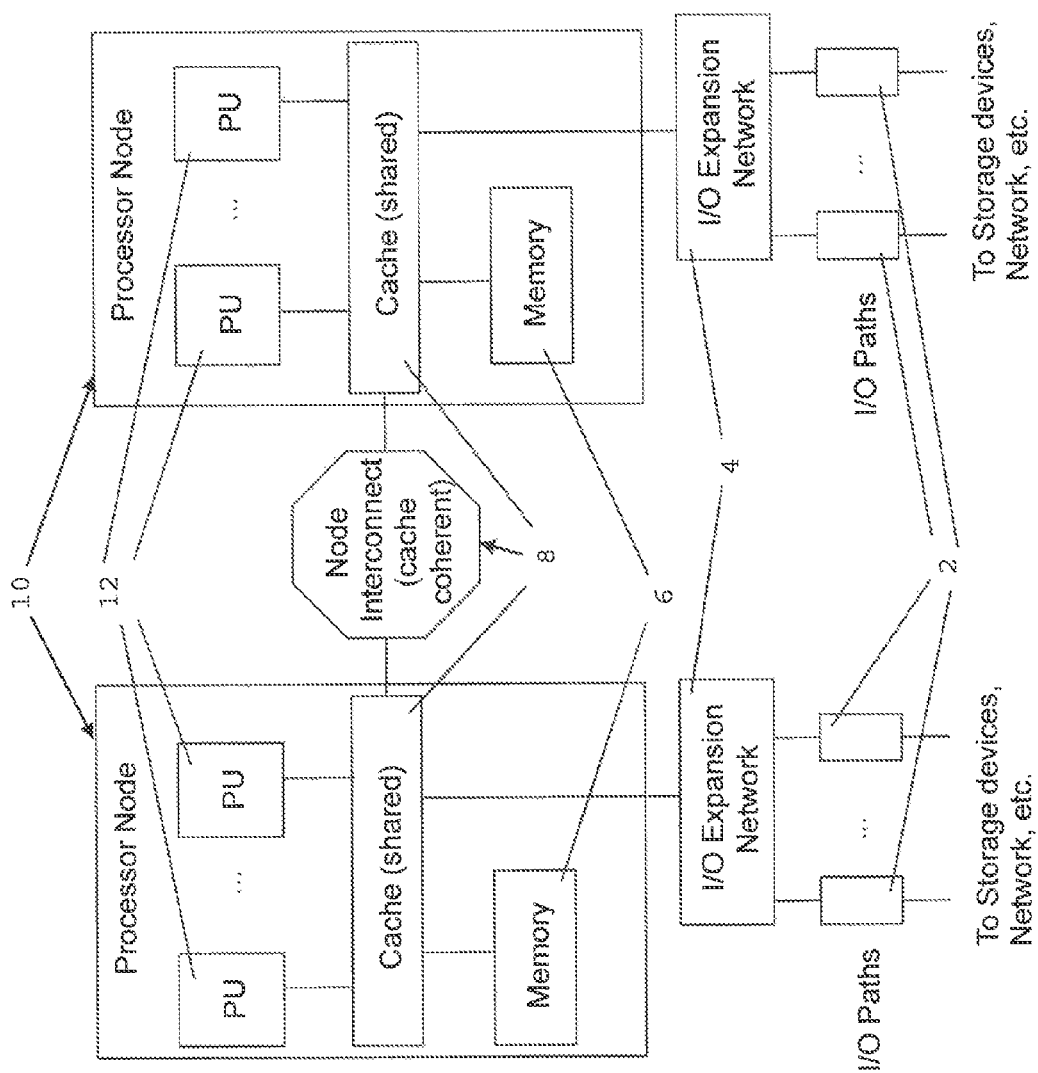
FIG. 1 is a block diagram illustrating the basic structural components of a prior art hardware and software environment.

One embodiment of one or more aspects of the present invention uses the prior art system and method known from GB Application No. GB 2454996 A. FIG. 1 illustrates the most basic structural components of prior art processor node hardware and software environment used for a prior art method in IBM's System z server products. This product line includes large multiprocessor systems with a high number of I/O paths 2 attached via an I/O expansion network 4 to one or more nodes 10, which are subsystems of the overall system. Each node contains multiple Processing Units 12 (PUs), which in an IBM System z server are used as general CPUs or System Assist Processors (SAPs). A shared cache 8 is provided amongst the multiple processors and nodes, with the node interconnect implementing a cache coherency protocol. Shared memory 6 is distributed across all nodes.

In general, when applying a prior art method the following steps are performed:
1. Initialization;
2. I/O initiative signaling;
3. Selection and firmware execution.

Figure 2:
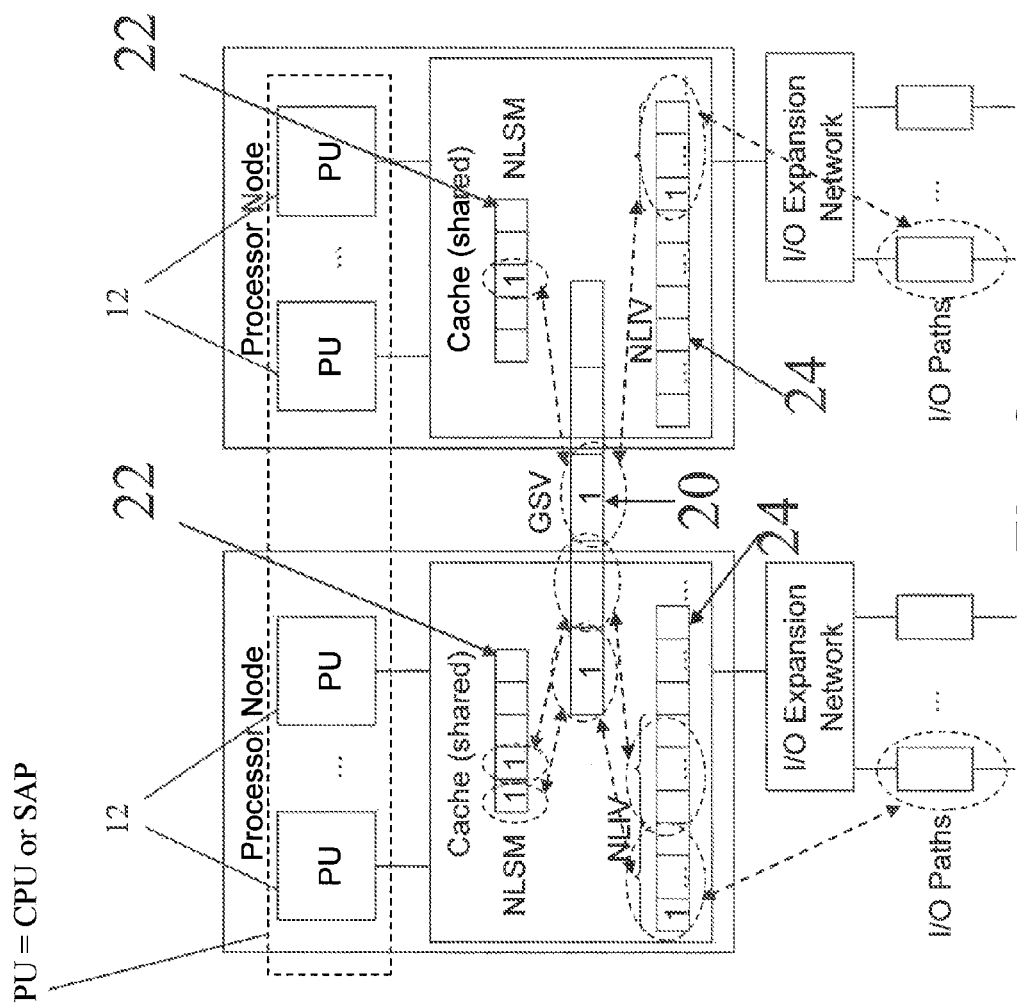
FIG. 2 is a block diagram illustrating basic structural components of a hardware and software environment, employed in accordance with one or more aspects of the present invention.

Step 1 is performed once at system startup or occasionally in hotplug scenarios, and described below. Steps 2 and 3 are performed continuously and with high frequency in a running system with ongoing I/O operations. With reference to FIG. 2, as to the initialization step, the SAP system initialization allocates and initializes the Global Summary Vector 20 (GSV), the Node Local Summary Masks 22 (NLSM), and the Node Local Interrupt Vectors (NLIV) 24. Broken line printed circles interconnected by bidirectional broken line arrows indicate bits or paths, respectively, corresponding to each other. The GSV 20 (e.g., 96 bits) is initialized to zero. Groups of (up to 64) channels are assigned one bit in this vector.

The NLIVs 24 are initialized to zero. There is one vector per node, and each channel physically attached to that node is assigned a unique bit position in that vector. One double word (64 bits) in the NLIV corresponds to one bit in the GSV. The NLIV is filled in by channels to signal initiative to the SAPs.

One NLSM 22 is defined per node. It has the same size as the GSV. A 1-bit in the NLSM indicates that the corresponding bit in the GSV describes summary initiative for channels of that node. GSV and NLSM are logically ANDed to identify those initiatives that are, for example, handled by SAPs on the local node. However, when no node-local initiative is found, a SAP will attempt to process initiative from the other nodes.

The prior art method takes the following specific characteristics into consideration:
  Distinction of local vs. remote nodes which corresponds to the "non-uniform" aspect, and
  The need to honor a functional affinity for specific operations;
wherein affinity is to be understood as the requirement to do initialization or to handle initiatives from an I/O path on a specific SAP.

The advantages of the concepts disclosed herein are achieved by reducing the balanced initiative handling to an I/O processor group instead of all I/O processors in the system. The prior art implementation handles "local" work, but it also handles "remote" work when no local initiative is pending. With the concepts disclosed herein, invention all I/O processors of an I/O processor group always check and handle only "local" initiatives. In one embodiment, the I/O processor groups are defined to be all I/O processors on one node sharing the cache between all I/O processors of one group. Other embodiments can even group just part of the processors of one node. As the processors of one I/O processor group use shared caches this reduces cache contention. As the number of I/O processors in one group is smaller than the number of all I/O processors, this also reduces firmware path length and control block contention.

Further, in one embodiment, the "local" property is changed from physical channel locality to "processor with functional affinity" locality. This removes the requirement for a special Functional Affinity Work Indication (FAWI) vector. The strict reduction to "local" work might lead to reduced overall throughput in case of peak or unbalanced workload, where one group of I/O processors becomes a bottleneck. Therefore, an additional balancing algorithm between the I/O processor groups is added on top. The additional balancing algorithm enables step by step spreading the initiatives (workload) across multiple I/O processor groups on a group base as soon as the I/O processor group with maximum group utilization reaches a certain high limit together with other processor groups being utilized significantly lower. Also, the additional balancing is decreased step by step again when either a certain low utilization limit is reached or the workload becomes more evenly balanced between the processor groups again.

Checking if increase or decrease of the balancing is required is done periodically but with low frequency to not affect overall performance: The checking and balancing happens asynchronously in predefined intervals. A firmware routine is called which does this independently from handling the initiatives. This routine is executed only on a dedicated I/O processor with low frequency to keep the performance impact as low as possible. For the balancing of the preferred embodiment six different scenarios case1, . . . , case6 are checked. As soon as a valid scenario is found, the associated action is taken and the actual balancing cycle ends without checking for other scenarios, since the actual change already influences the workloads for the different I/O processor groups.

Figure 3A:
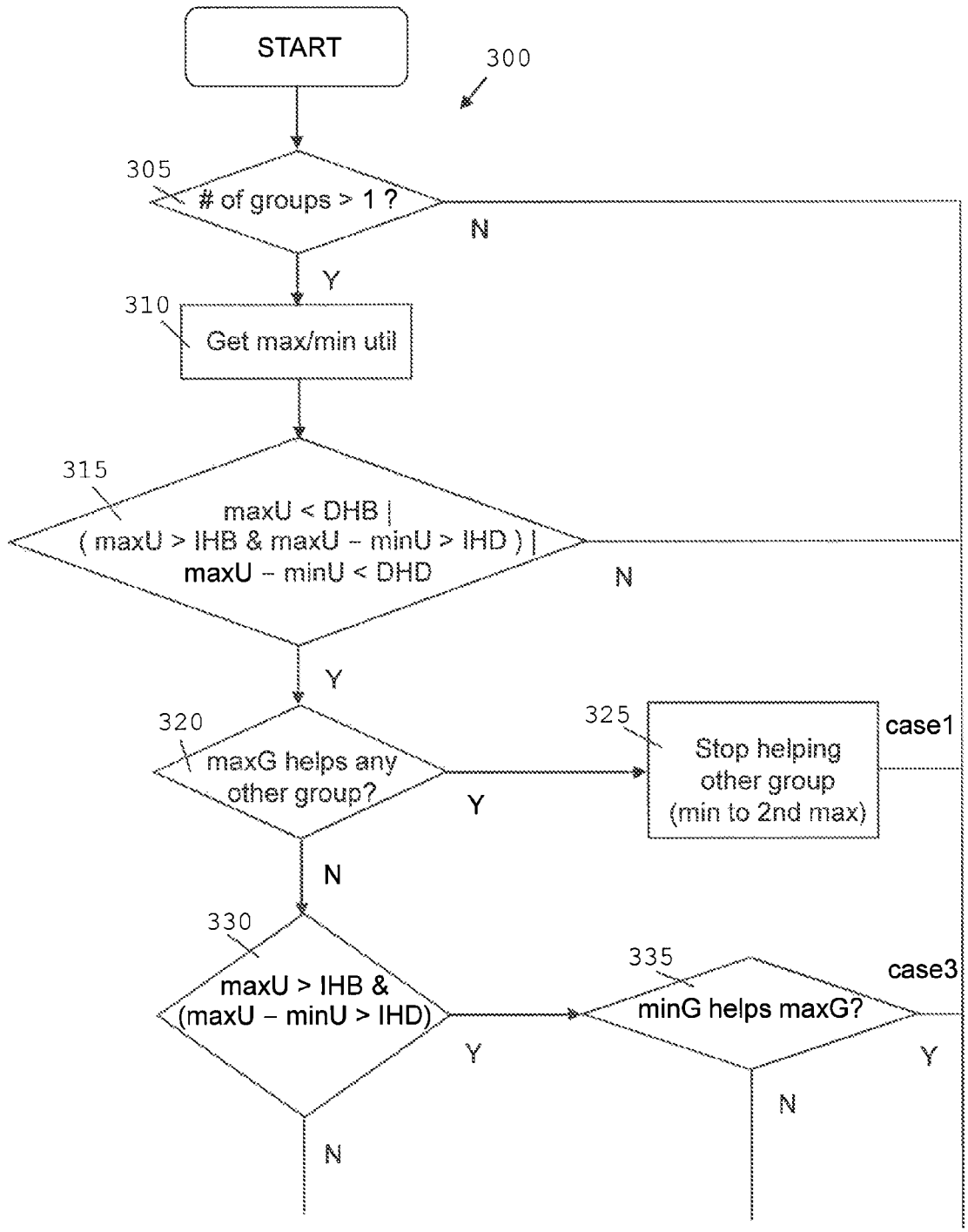
FIGS. 3A-3B depict a process for handling inbound initiatives in an input/output (I/O) subsystem of a multi-node computer system, in accordance with one or more aspects of the present invention.
Figure 3B:
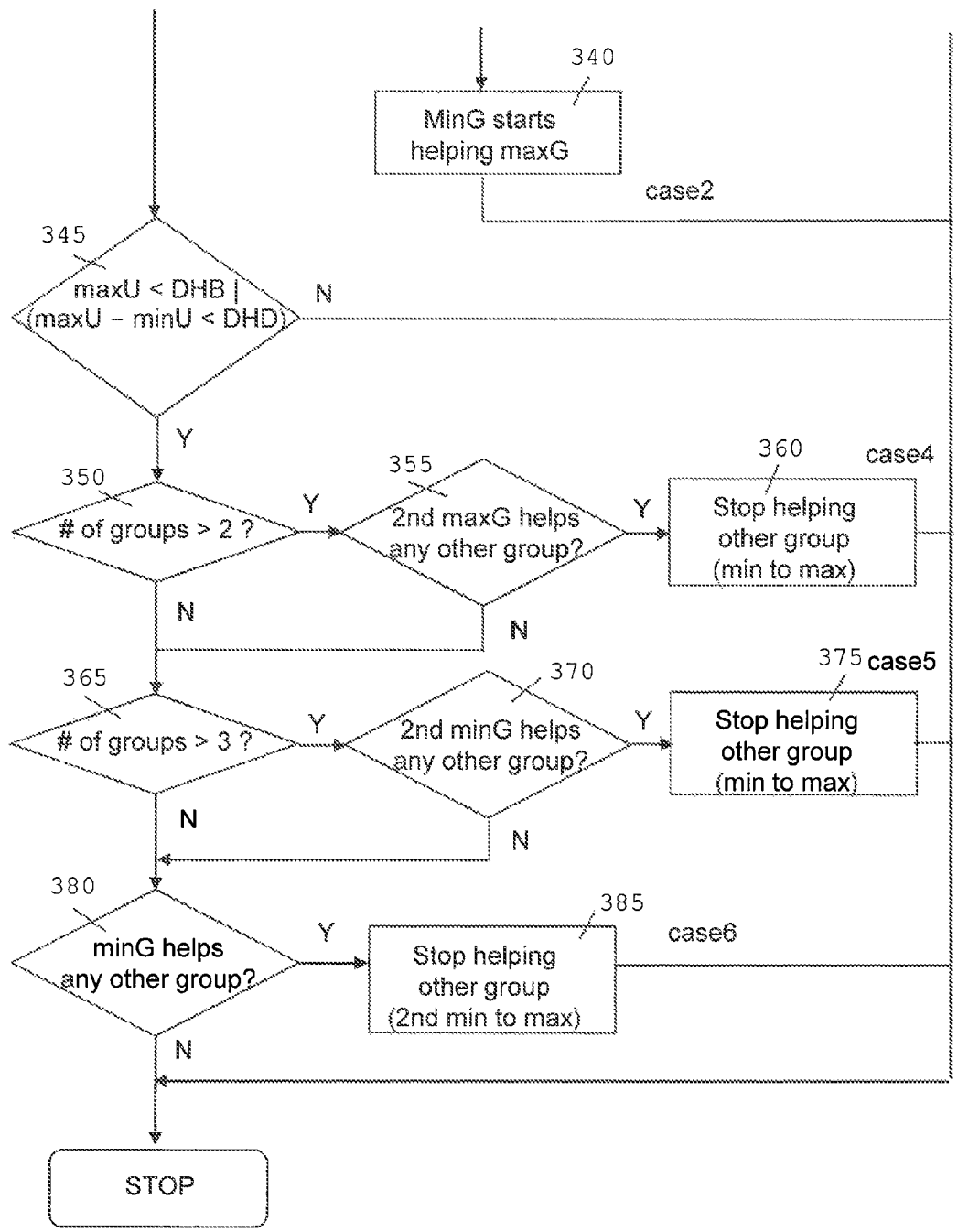

FIGS. 3A & 3B depict one embodiment of a method 300 that is performed by the firmware routine. In step 305 it is determined if there is more then one I/O processor group available. If this is not the case then no action needs to be taken since there is no other I/O processor group available for balancing. Otherwise, for the last measurement interval the minimum utilization (minU) is calculated in step 310 with the respective I/O processor group number (minG) and the maximum utilization (maxU) is calculated with the respective I/O processor group number (maxG). If applicable, then also the second maximum group and the second minimum group utilizations are calculated for potential later usage. Then in step 315 three entrance criteria are checked before the different balancing methods are started:
  Increase balancing case: maxU is higher than a predefined Increase Help Boundary (IHB) and the difference between maxU and minU is higher than a predefined Increase Help Difference (IHD); or
  First decrease balancing case: maxU is lower than a predefined Decrease Help Boundary (DHB); or
  Second decrease balancing case: maxU−minU is lower than a predefined Decrease Help Difference (DHD).

If no criterion is fulfilled, then the method 300 simply exits. Otherwise it is checked in step 320 if the I/O processor group maxG already helps any other groups. If this is the case (case1), then the additional work caused by the currently lowest utilized I/O processor group is released in step 325 to return step by step to the original workload on the I/O processor group maxG. Otherwise, it is checked in step 330 again if this is the increase balancing case, where maxU is higher than the IHB and maxU−minU is higher than the IHD. If this condition is true, it is checked in step 335 if the I/O processor group minG does not already help the I/O processor group maxG. If not (case2), then the I/O processor group minG is allowed in step 340 to do as well the work for the I/O processor group maxG (case2). If it is determined in step 335 that the I/O processor group minG already helps the I/O processor group maxG (case3) then any further additional balancing increase would not help as the I/O processor group minG has still enough capacity to help the I/O processor group maxG: The utilization of the I/O processor group maxG can be high due to other reasons than the backend handling. The method 300 is exited in this case.

If it was determined in step 330 that it is not the increase balancing case, then apparently no increase balancing is required. It will then be determined in step 345 if this is one of the decrease balancing cases, where maxU is lower than the DHB or maxU−minU is lower than the DHD. If not, then the method 300 exits. Otherwise it is checked in step 350 if more than two I/O processor groups are available. If so, then it is checked in step 355 if the second maximum I/O processor group $2^{nd}$ max helps any other I/O processor groups (case4), and if so, the additional work caused by the currently lowest utilized I/O processor group is released in step 360 to return step by step to the original workload on the I/O processor group $2^{nd}$ max.

If it was determined in step 355 that it was not the case, then it will be determined in step 365 if the number of I/O processor groups is greater than 3. If so, then it is checked in step 370 if the second minimum I/O processor group $2^{nd}$ min helps any other I/O processor groups (case5), and if so, the additional work caused by the currently lowest utilized I/O processor group is released in step 375 to return step by step to the original workload on the I/O processor group $2^{nd}$ min. If it was determined in step 370 that it is not the case, then it is finally checked in step 380 if the I/O processor group minG with the lowest utilization can be released from any other work to reach a state where all I/O processor groups do only their own work. If so, then the work will be released in step 385 incrementally.

Figure 4:
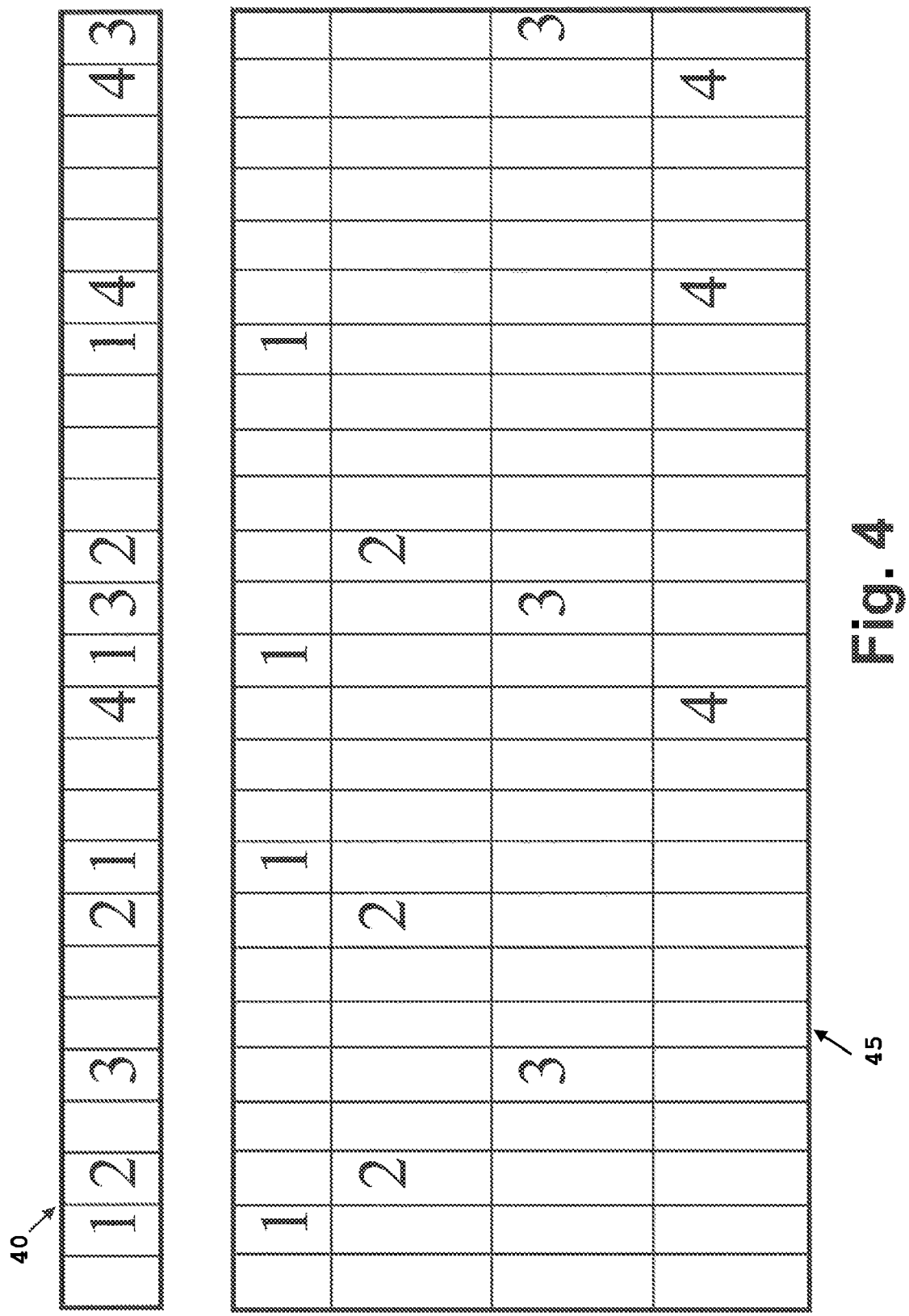
FIG. 4 illustrates one embodiment of data structures used in accordance with one or more aspects of the present invention.

In one embodiment, four different I/O processor groups can be used. Any other number of I/O processor groups can be supported in a similar fashion. FIG. 4 illustrates data structures used in the preferred embodiment of the invention. A GSV 40 is shown, which captures initiatives from channels. The GSV 40 exists only once in the system and access to it is shared between the different SAPs. The numbers 1, . . . , 4 in some of the fields represent the four I/O processor groups that the various channels have affinity to. Block 45 shows four NLSM instances in the system. As described above, an NLSM instance is a data structure, which exists once per group, is essentially constant and holds the same content for all processors within one group. The combination of the GSV 40 with an NLSM via a bit-wise logical AND operation gives the pending initiatives for channels with affinity to any combination of any number of I/O processor groups.

Similarly, the work of each I/O processor group can be encoded efficiently. In the preferred embodiment one mask is used for each I/O processor group respectively, wherein each of field represents a set of channels with a maximum of 64 channels which all have the same affinity. With normal workload each I/O processor group does only care for its own work, namely the initiatives of the channels to which it has an affinity to. If it is determined that the amount of work for one I/O processor group will be increased after a pair of groups was detected that can help each other (one I/O processor group has the maximum utilization and the other I/O processor group has the minimum utilization), the mask of the I/O processor group with the minimum utilization will be combined with the content of the mask of the I/O processor group with the maximum utilization. This leads to a mask for the group with the minimum utilization that encodes the work for both I/O processor groups. If, on the other hand, it is decided that the amount of work will be decreased for a particular I/O processor group, then it will be checked if the amount of work for this particular I/O processor group was previously increased by the work of another I/O processor group. If that is the case, then the additional workload can simply be removed by dividing the combined mask again.

Figure 5:
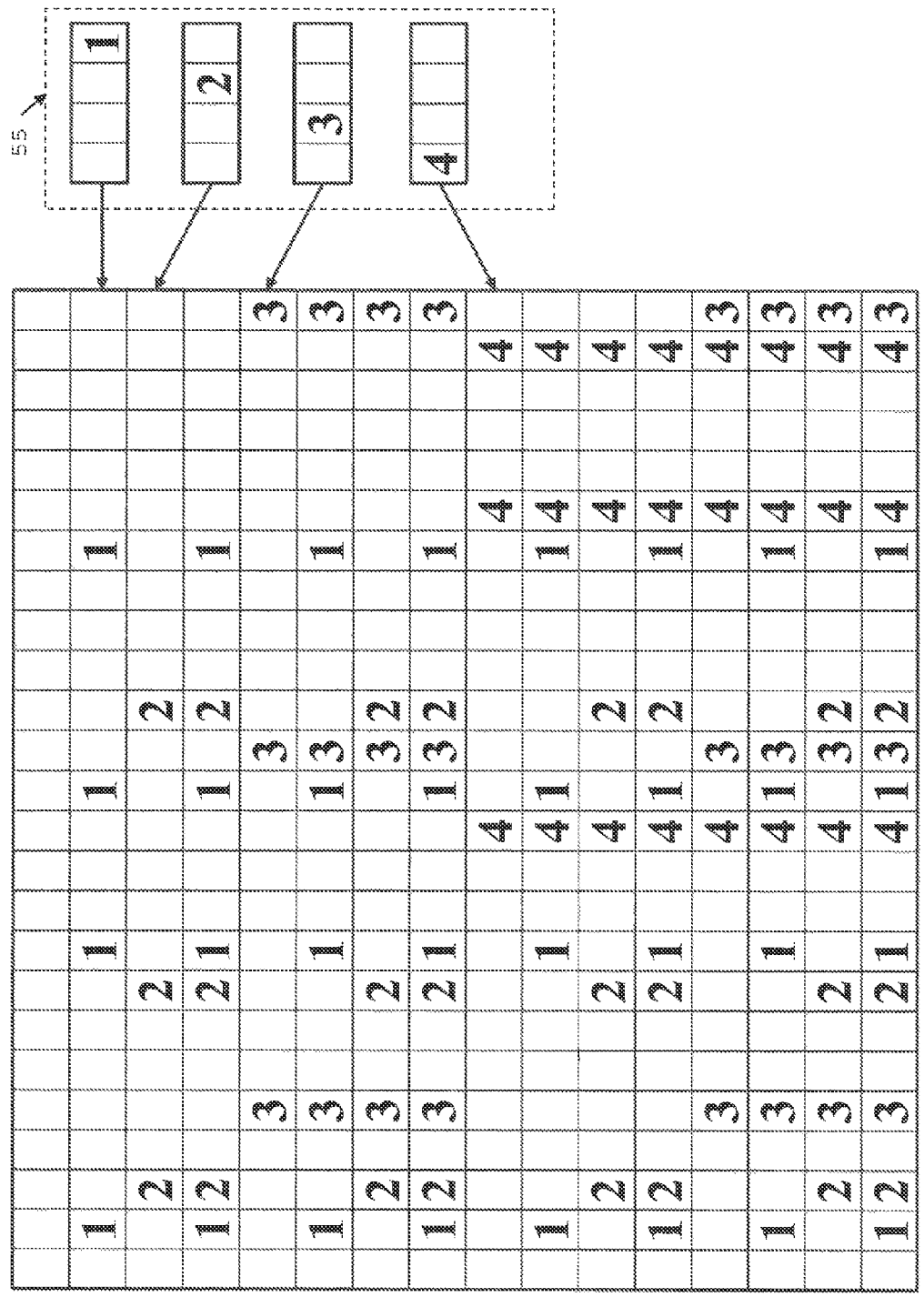
FIG. 5 illustrates a further embodiment of data structures used in accordance with one or more aspects of the present invention.

In one embodiment, this is implemented very efficiently by using a pre-initialized initiative balancing mask table 50 as shown in FIG. 5. The initiative balancing mask table 50 exists only once in the system and is not changed. It contains masks of initiatives for channels with affinities to any combination of any number of I/O processor groups. As in FIG. 4, the numbers 1, . . . , 4 in some of the fields represent the four I/O processor groups that the various channels have affinity to. This allows avoiding the expensive building of such combinations during the actual execution of the work as only table lookup operations need to be performed. The method adapts only indices used for the table lookup. Such table index exists once per processor group. The table indices 55 shown in FIG. 5 represent the four I/O processor groups. The table indices point to the currently active initiative mask for the respective group and are modified based on the load distribution.

The following are achieved in the embodiment described herein:

1. As each I/O processor of an I/O processor group is generally eligible to handle any initiative for that I/O processor group, workload is balanced across the available processor capacity of that I/O processor group, thereby improving overall throughput and latency.
2. Workload from high-performance I/O paths whose traffic would exceed the capacity of one I/O processor is distributed across multiple I/O processors of an I/O processor group.
3. As the workload is distributed honoring hardware structures (cache), optimum overall system performance is achieved.
4. A FAWI vector is no longer required as the processor with functional affinity to the I/O path is always part of the I/O processor group assigned to the I/O path.
5. Additional balancing between the I/O processor groups allows handling of peak or unbalanced workload with optimum throughput.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 6:
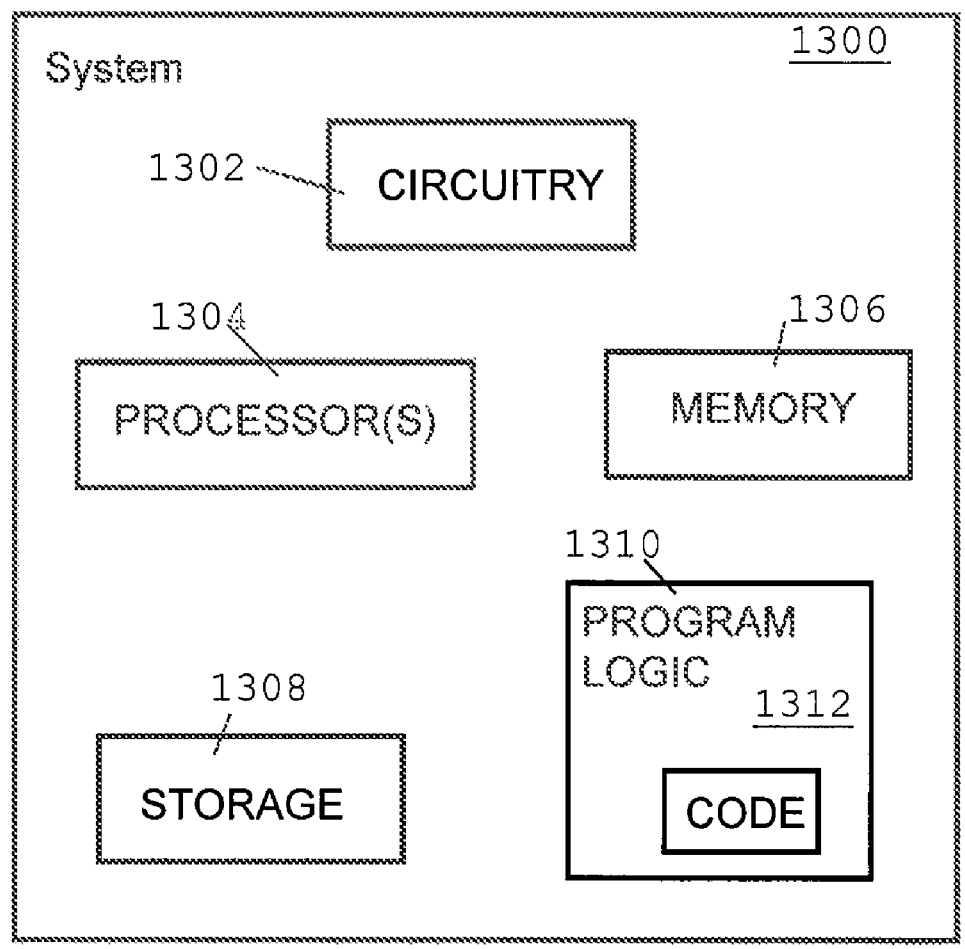
FIG. 6 is a block diagram of a computer system in which one or more aspects of the present invention may be implemented.

FIG. 6 illustrates a block diagram of a computer system 1300 in which certain embodiments may be implemented. The system 1300 may include a circuitry 1302 that may in certain embodiments include a microprocessor 1304. The computer system 1300 may also include a memory 1306 (e.g., a volatile memory device), and storage 1308. The storage 1308 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1308 may comprise an internal storage device, an attached storage device and/or a network accessible storage device. The system 1300 may include a program logic 1310 including code 1312 that may be loaded into the memory 1306 and executed by the microprocessor 1304 or circuitry 1302. In certain embodiments, the program logic 1310 including code 1312 may be stored in the storage 1308. In certain other embodiments, the program logic 1310 may be implemented in the circuitry 1302. Therefore, while FIG. 6 shows the program logic 1310 separately from the other elements, the program logic 1310 may be implemented in the memory 1306 and/or the circuitry 1302.

The flowchart and block diagrams in the FIG.s illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A method for handling inbound initiatives in an input/output (I/O) subsystem of a multi-node computer system, wherein in each node, a plurality of I/O processors communicate with I/O devices, via a plurality of I/O paths corresponding to said plurality of nodes, and wherein said initiatives are generated by I/O hardware and/or firmware addressed by a precedent I/O request issued by a respective one of said I/O processors, and wherein said initiatives are to be processed by one or by a group of said multiple I/O processors, the method comprising:

using at least one pre-defined, first data element indicating incoming or existing initiatives from any I/O path of all of said nodes and to be served by one of said I/O processors;

using a plurality of second data structures, one of said second structures per I/O processor group, wherein each of said second data structures defines which initiative is preferably handled by which I/O processor or group of processors, respectively;

using a plurality of third data structures, one of said third structures per I/O processor group, wherein multiple bits can be set in order to indicate the occurrence of respective initiatives for respective multiple I/O processors; and repeatedly balancing the workload between the groups of I/O processors by distributing initiatives to other groups of I/O processors in addition to the preferred group.

2. The method of claim 1, wherein each group of I/O processors comprises only I/O processors that use a common shared processor cache (8) for the respective group.

3. The method of claim 2, wherein each group of I/O processors comprises only I/O processors of the same node for the respective group.

4. The method of claim 1, wherein the balancing is performed by an I/O processor asynchronously to the processing of the initiatives.

5. The method of claim 1, wherein the balancing comprises:

determining the groups of I/O processors with the minimum and maximum utilization; and distributing initiatives from the group with the maximum utilization also to the group with the minimum utilization.

6. A computer program product for handling inbound initiatives in an input/output (I/O) subsystem of a multi-node computer system, wherein in each node, a plurality of I/O processors communicate with I/O devices via a plurality of I/O paths corresponding to said plurality of nodes, and wherein said initiatives are generated by I/O hardware and/or firmware addressed by a precedent I/O request issued by a respective one of said I/O processors, and wherein said initiatives are to be processed by one or by a group of said multiple I/O processors, the computer program product comprising:

a computer-readable storage medium readable by a processor and storing instructions for execution by the processor for performing a method comprising:

using at least one pre-defined, first data element indicating incoming or existing initiatives from any I/O path of all of said nodes and to be served by one of said I/O processors;

using a plurality of second data structures, one of said second structures per I/O processor group, wherein each of said second data structures defines which initiative is preferably handled by which I/O processor or group of processors, respectively;

using a plurality of third data structures, one of said third structures per I/O processor group, wherein multiple bits can be set in order to indicate the occurrence of respective initiatives for respective multiple I/O processors; and repeatedly balancing the workload between the groups of I/O processors by distributing initiatives to other groups of I/O processors in addition to the preferred group.

7. The computer program product of claim 6, wherein each group of I/O processors comprises only I/O processors that use a common shared processor cache (8) for the respective group.

8. The computer program product of claim 7, wherein each group of I/O processors comprises only I/O processors of the same node for the respective group.

9. The computer program product of claim 6, wherein the balancing is performed by an I/O processor asynchronously to the processing of the initiatives.

10. The computer program product of claim 6, wherein the balancing comprises:

determining the groups of I/O processors with the minimum and maximum utilization; and distributing initiatives from the group with the maximum utilization also to the group with the minimum utilization.

11. A computer system comprising means for handling inbound initiatives in an input/output (I/O) subsystem of a multi-node computer system, wherein in each node, a plurality of I/O processors communicate with I/O devices, via a plurality of I/O paths corresponding to said plurality of nodes, and wherein said initiatives are generated by I/O hardware and/or firmware addressed by a precedent I/O request issued by a respective one of said I/O processors, and wherein said initiatives are to be processed by one or by a group of said multiple I/O processors, the computer system comprising:

a memory; and a processor in communications with the memory, wherein the computer system is configured to perform a method, the method comprising:

using at least one pre-defined, first data element indicating incoming or existing initiatives from any I/O path of all of said nodes and to be served by one of said I/O processors;

using a plurality of second data structures, one of said second structures per I/O processor group, wherein each of said second data structures defines which initiative is preferably handled by which I/O processor or group of processors, respectively;

using a plurality of third data structures, one of said third structures per I/O processor group, wherein multiple bits can be set in order to indicate the occurrence of respective initiatives for respective multiple I/O processors; and repeatedly balancing the workload between the groups of I/O processors by distributing initiatives to other groups of I/O processors in addition to the preferred group.

12. The computer system of claim 11, wherein each group of I/O processors comprises only I/O processors that use a common shared processor cache for the respective group.

13. The computer system of claim 12, wherein each group of I/O processors comprises only I/O processors of the same node for the respective group.

14. The computer system of claim 11, wherein the balancing is performed by an I/O processor asynchronously to the processing of the initiatives.

15. The computer system of claim 11, wherein the balancing comprises:

determining the groups of I/O processors with the minimum and maximum utilization; and distributing initiatives from the group with the maximum utilization also to the group with the minimum utilization.

* * * * *